United States Patent
Farrugia et al.

(10) Patent No.: US 8,386,787 B2
(45) Date of Patent: Feb. 26, 2013

(54) HASH FUNCTION USING A HEAP MODELING PROCESS

(75) Inventors: Augustin J. Farrugia, Cupertino, CA (US); Benoit Chevallier-Mames, Paris (FR); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 846 days.

(21) Appl. No.: 12/551,267

(22) Filed: Aug. 31, 2009

(65) Prior Publication Data

US 2011/0055576 A1    Mar. 3, 2011

(51) Int. Cl.
*H04L 9/32* (2006.01)
(52) U.S. Cl. ...................................................... 713/176
(58) Field of Classification Search .................. 713/176, 713/179, 180, 181; 380/28, 46
See application file for complete search history.

(56) References Cited

U.S. PATENT DOCUMENTS

| | | | |
|---|---|---|---|
| 6,185,559 B1* | 2/2001 | Brin et al. | 707/758 |
| 7,257,711 B2* | 8/2007 | Goodrich et al. | 713/176 |
| 7,299,390 B1* | 11/2007 | Dastidar | 714/726 |
| 7,444,515 B2* | 10/2008 | Dharmapurikar et al. | 713/176 |
| 7,613,701 B2* | 11/2009 | Zhao et al. | 1/1 |
| 7,644,440 B2* | 1/2010 | Sinha et al. | 726/23 |
| 7,657,581 B2* | 2/2010 | Orenstein et al. | 707/661 |
| 8,185,745 B2* | 5/2012 | Singh et al. | 713/180 |

* cited by examiner

*Primary Examiner* — Beemnet Dada
(74) *Attorney, Agent, or Firm* — Adeli & Tollen LLP

(57) ABSTRACT

This discloses, in the computer data security field, a cryptographic hash function process embodied in a computer system and which may be keyless, but is highly secure. The process is based on the type of randomness exhibited by a heap or stack of physical objects such as a heap of pieces of fruit and involves modeling the behavior of such a heap when pieces are removed from the heap. Computation of the hash value (digest) is thereby the result of executing a heap model algorithm using the message as an input to initialize the heap, then executing the heap model algorithm which logically models the process of serially removing objects (pieces of fruit) from the heap at various locations in the modeled heap.

26 Claims, 4 Drawing Sheets

| NAME | TYPE | COMMENTS |
|---|---|---|
| PACKET_HEIGHT | integer | number of lines of array FruitPacket |
| PACKET_WIDTH | integer | number of columns of array FruitPacket |
| FruitPacket | integer array | an array representing the fruit heap |
| Message | integer array | the entry of the hash function |
| output | integer array | the output digest of the hash function |
| kSEC_PARAMETER | integer | a security parameter |

*Fig. 2*

HASH FUNCTION USING A HEAP MODELING PROCESS

FIELD OF THE INVENTION

This invention relates to computing, communications, data security, and hash functions (hashing).

BACKGROUND

Hash functions are well known in the field of data security. The principle is to take data (a digital message, digital signature, etc.) and use it as an entry to a hash function resulting in an output called a "digest" of predetermined length which is intended to uniquely identify ("fingerprint") the message. A secure (cryptographic) hash is such that any alteration in the message results in a different digest, even though the digest is much shorter than the message. Such hash functions are "collision-resistant" and "one-way."

Cryptography and data security deal with digital signatures, encryption, document authentication, and hashing. In all of these fields, there is a set of basic tools/functions which are widely used, for instance hash functions. Several properties are required for the use of hash functions in cryptographic applications: preimage resistance, second preimage resistance and collision resistance.

In the recent years, much energy has been expended finding new hash functions, since collisions (weaknesses or successful attacks) have been found in the widely used SHA-1 standard hash.

SUMMARY

Disclosed here is a new type of cryptographic (secure) hash function or process. The goal is a highly modular hash function that is also computationally efficient. The present hash function can conventionally be used for document integrity for exchanges and signatures. It can be also used as a derivation function or as a HMAC (hash message authentication code) by adding a key conventionally (as in for instance the well known HMAC-SHA1) and the term "hash" as used herein is intended to encompass all these uses, both keyed and non-keyed.

A hash function is a deterministic procedure that accepts an arbitrary input value, and returns a hash value. The input value is called the message, and the resulting output hash value is called the digest. The message is authenticated by comparing the computed digest to an expected digest associated with the message.

The present hash process is based on the concept and logic of a heap (pile) of physical objects such as a heap of pieces of fruit. The disclosure is of a new kind of hash function based on modeling the physics of heaps of objects such as fruit. The principle is to model a heap of three dimensional objects, and to remove one of the pieces of fruit (objects) from the heap. The remaining fruits fall under the influence of gravity, introducing strong and non-certain movements in the heap which are useful for a hash function.

This hash function is easy to implement, especially in hardware (logic circuitry) since several of its operations deal with ordering data in internal round. (In the pseudo code set forth below, this internal round is the control loop involving the index "ii".) From a practical hardware or software implementation of the model, this means just connecting memory locations. This process results in a small (in a computational sense) and high frequency (fast to execute) software or hardware component. In the present hash function, there is no introduction of randomness in such a process since the way the objects fall in the heap as other objects are removed is uniquely determined by the initial heap state (arrangement) in one embodiment. This means the hash function disclosed here is completely deterministic.

The present approach is based on the observation that when physical objects such as pieces of fruit are serially removed from a heap, the result is very chaotic. The present goal is to use the principle of such heaps to compute a hash function since such a chaotic characteristic is a key feature to build a secure hash function. In this sense secure means strongly one way, meaning that given a message it is easy to compute the digest, but it is very difficult to find a message that returns a given digest.

In the present process, it is assumed in one embodiment that the physical objects making up the heap and being modeled are frictionless spheres of uniform size, and the heap is supported on a surface and subject to a uniform force such as gravity. Other variations are more complex to model but are also in accordance with the invention. For instance, the objects could be modeled as other than spherical, or as being of different sizes, or more than one object could be removed from the heap at a time. In other embodiments, there are different configurations of the heap; other actions on the heap, e.g., "pushing" it, or forcing the introduction of new pieces of fruit (objects) into the interior of the heap.

Note that terms such as "heap," "stack," "object," "fruit," "position," "piece," "fall," "core," "movement," "gravity," "force," "right," and "left" as used here in connection with the present invention do not refer to any physical object or any actual depiction of same even on a computer or game display, but instead to values, identifiers, or variables used in computer code or logic to compute a hash function or equivalent, and are used only for convenience of understanding herein as referring conceptually to analogous aspects of the above described physical heaps. The term "heap" here is used in its ordinary sense and does not refer to its particular use in computer science, where it means an area of computer memory used for dynamic memory allocation, such as a binary tree.

BRIEF DESCRIPTION OF THE FIGURES

FIG. 2 shows a set of variables and parameters as used here.

DETAILED DESCRIPTION

The present method uses the principle described above of modeling a large heap of objects such as pieces of fruit (e.g., oranges). In this heap modeling, one takes a piece of fruit from the heap, and consequently other pieces of fruit in the heap fall to replace the removed piece. The procedure is applied again and again, to substantially modify the heap. A security parameter is provided designated as kSEC_PARAMETER (see below) which represents the number of times the procedure of removing one of the pieces of fruit from the heap is done. This parameter is a configurable value.

References to "fruit" here refer to any modeled object, e.g., a geometric figure, such as a circle, where a plurality of such objects are typically of uniform size and shape. The objects may be two dimensional (as depicted in present FIG. 1 and in the pseudo code example below), or three dimensional objects. "Heap" refers to a plurality of such objects modeled as a collectivity, when in contact with one another under the influence of a one-directional "force." "Force" refers to the objects in the heap being capable of "falling" so as to maintain cohesion of the heap. All these concepts are notional, in that the model is purely a logical and mathematical construct and may ignore factors such as friction.

In this hash function, initially consider the heap as a rectangular (two-dimensional) data array designated FruitPacket made up of PACKET_HEIGHT (an integer) lines and PACKET_WIDTH (an integer) columns. Each of the cells in the array is an integer, which represents a piece of fruit in the heap. The cells are of any suitable length, e.g. a few bits, 8 bits, 16 bits, 32 bits, 64 bits, etc. Assume that each position (cell) in the array is denoted (i,j), where i is the line index and j is the column index. By definition, 0<=i<PACKET_HEIGHT and 0<=j<PACKET_WIDTH. By convention, consider (0,0) to be the position in the bottom and left of the heap, and the position (PACKET_HEIGHT-1, PACKET_WIDTH-1) to be the position in the top right of the heap.

When considering the central part of the heap, i.e. not at its extremities (edges), when one removes the piece of fruit at position (i,j), this piece will be replaced, by the effect of the force, either by the piece in position (i+1, j−1) [meaning the piece from top left fell], or by the piece in position (i+1,j) [meaning the piece from the top center fell], or finally by the piece in position (i+1,j+1) [meaning the piece from the top right fell]. When considering the extremities of the heap, i.e. if j=0 or j=PACKET_WIDTH-1, some situations are naturally impossible. They are not described here, as they are trivial to observe. For instance, a piece at an extremity (edge) of the heap may not have another object located above it and so would not be replaced due to the force if removed.

Figure 1:
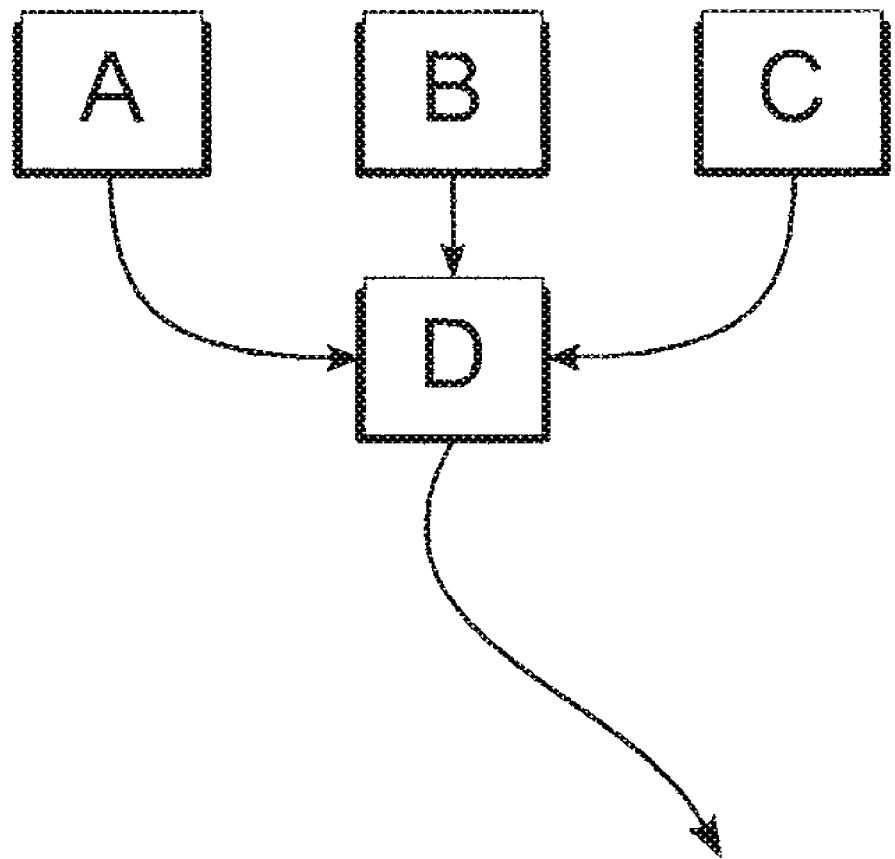
FIG. 1 depicts graphically a simple heap.

This remove, falling and replacement situation is depicted graphically in the heap of FIG. 1. In the model, when one removes piece of fruit (object) D from the heap, which includes pieces A, B, C and D, piece D is replaced (due to the force) as shown by the arrows either by piece A or piece B or piece C. Once piece A or B or C has replaced piece D, the falling and replacement process is reapplied on the previous location of the replacement piece of fruit.

Once a piece of fruit has fallen into the previously empty position, if it was not in the uppermost position (line), it creates its own new empty position, and so the falling and replacement process is reapplied, until the top of the heap is attained, meaning that any remaining empty positions have no piece located immediately above them. Finally, one places in the uppermost empty position the piece of fruit that was taken from the heap initially, so that the number of pieces of fruit in the heap remains constant.

For the present hash function, consider the following logical process which models this physical heap, and which may have variants as explained below:

(i) Fill the cells of the heap (the array) with integers which depend in some predetermined way on the message. This may be done several ways. For instance the message itself can be entered byte by byte into the cells of the array. Or, the message could be logically combined using the Boolean XOR (exclusive OR) operation with some predetermined initial values previously entered into the cells and the result entered into the cells. Or the message can be expanded using conventional cryptographic message expansion to make it longer (for better security) and the expanded message entered into the cells. An example of message expansion is to use the message as a seed value entered into a conventional pseudo random number generator, and then to enter the resulting pseudo random numbers into the cells.

(ii) Apply the above "take-a-fruit" process (remove, falling and replacement) a certain number of times.

(iii) Output (extract) some of the bytes of the resulting heap array, as the output (digest) of the hash function.

Expressed for ease of understanding in computer software pseudo-code (which is conventionally structurally similar to actual code but somewhat less detailed and not executable), the present hash function process as described above is as follows:

```
/* Initialise the fruit heap */
for (I = 0; i < PACKET_HEIGHT; i++)
{
    for (j = 0; j < PACKET_WIDTH; j++)
    {
        FruitPacket[i][j] = FunctionInit(Message, i, j);
    }
}
/* Do several times the pick-a-fruit procedure on the full FruitPacket array */
for (k = 0; k < kSEC_PARAMETER; k++)
{
    /* Pick and let fruits fall */
    // Pick a random position
    ii = FunctionF(Message, FruitPacket) % PACKET_HEIGHT;
    jj = FunctionG(Message, FruitPacket) % PACKET_WIDTH;
    // Take the fruit
    CurrentFruit FruitPacket[ii][jj];
    // Do the replace loop
    nii = ii;
    njj = jj;
    while (ii < PACKET_HEIGHT−1)
    {
        // Decide which fruit is replacing the old one
        if ((jj > 0) && (jj < (PACKET_WIDTH−1)))
        {
            // Whatever of the 3 positions: upper, up left or up right
            choice = FunctionH(Message, FruitPacket.) % 3;
            if (choice == 0)
            {
                // Up left
                nii = ii + 1;
                njj = jj − 1;
            }
            else if (choice == 1)
            {
                // Up
                nii = ii + 1;
                njj = jj;
            }
            else
            {
                // Up right
                nii = ii + 1;
                njj = jj + 1;
            }
        }
        else if (jj > 0)
        {
            // Either upper or up left
            choice = FunctionI(Message, FruitPacket) % 2;
            if (choice == 0)
            {
                // Up left
                nii = ii + 1;
                njj = jj − 1;
            }
            else
            {
                // Up
                nii = ii + 1;
                nii = jj
            }
        }
```

```
      else
      {
        // Either upper or up right
        choice = FunctionJ(Message, FruitPacket) % 3;
        if (choice == 0)
        {
          // Up right
          nii = ii + 1;
          njj = jj + 1;
        }
        else
        {
          // Up
          nii = ii + 1;
          njj = jj;
        }
      }
      // Move the fruit
      FruitPacket[ii][jj] = FruitPacket[nii][njj];
      ii = nii;
      jj = njj;
    }
    // Place the old fruit to the last position
    FruitPacket[nii][njj] = CurrentFruit;
  }
  /* Output */
  ConstructOutput(output, FruitPacket);
```

The security parameter kSEC_PARAMETER indicates the number of times the "pick-a-fruit" process is repeated. Function FunctionInit is used to initialize the heap of fruit (the array), with integers depending on the message as explained above. FunctionF, FunctionG, FunctionH, FunctionI, FunctionJ are functions that each use the message and the current state of the heap to create a derived pseudo-random integer. Then this pseudo-random integer is used to make a decision when there are several possibilities, such as which of the possible pieces of fruit (as in FIG. 1) falls into an empty position. Finally, function ConstructOutput is a function which takes the current state of the fruit heap array, and conventionally extracts particular portions (bytes, bits, etc.) of it in a predetermined fashion to construct the output. In this pseudo code, "/*" and "*/" denote non-compilable comments, as does "//". "++" indicates increment by one. "%" designates the modulus operation.

In order to increase the complexity of this hash function (for better security), in other embodiments one may modify the structure of the heap regularly during the hash computation process. Notably, one may consider more complex (but still two-dimensional) rectangular, triangular, or square arrays which represent heaps of fruit. In other embodiments which are more complex, the heap (and also the corresponding array) is three or more dimensional. A three dimensional heap means that the base of the heap, rather than being a single line of the objects (pieces of fruit), defines a rectangle, triangle, square, etc. In this case the array has three corresponding dimensions: line, column, and depth. The update process which begins with "while (ii<PACKET_HEIGHT-1)" in the pseudo code would be modified accordingly.

FIG. 2 shows variables and parameters for the above pseudo code with their type and explanatory comments.

The pseudo code does not include the conventional subsequent steps of using the computed digest which means comparing the computed digest to the digest that accompanies the message to verify the message.

Figure 3:
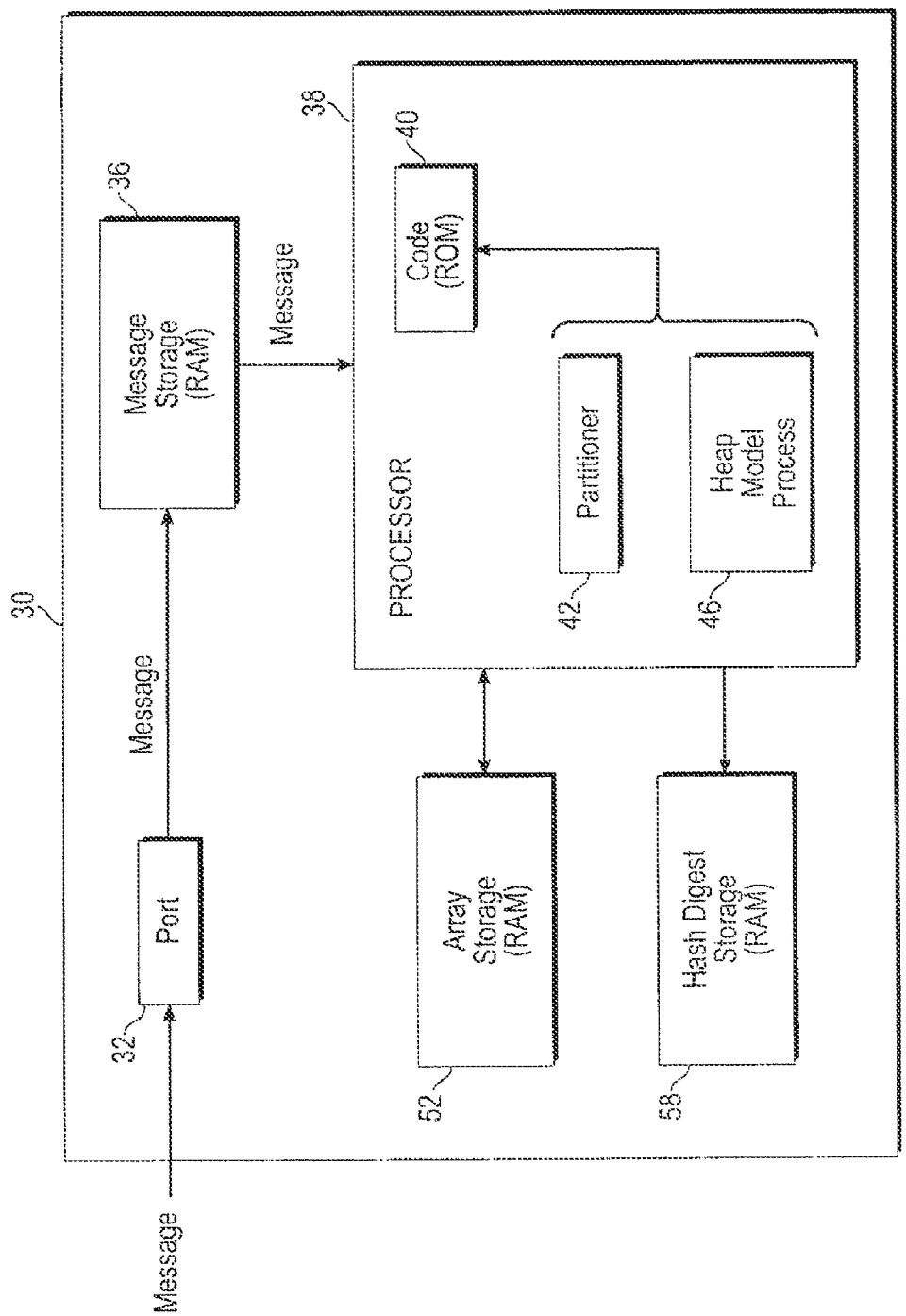
FIG. 3 shows relevant portions of a computing apparatus for carrying out the present method.

FIG. 3 shows in a block diagram relevant portions of a computing device (system) 30 in accordance with the invention. This is, e.g., a computer, mobile telephone, Smart Phone, personal digital assistant or similar device, or part of such a device and includes conventional hardware components executing in one embodiment software (computer code) as represented by the above pseudo-code examples. This code may be, e.g., in the C or C++ computer language or its functionality may be expressed in the form of firmware or hardware logic; writing such code or designing such logic would be routine in light of the above pseudo code. Of course, the above pseudo code example is not limiting.

The computer code is conventionally stored in code memory (computer readable storage medium, e.g., ROM) 40 (as object code or source code) associated with processor 38 for execution by processor 38. The incoming message to be hashed is received at port 32 and stored in computer readable storage medium (memory, e.g., RAM) 36 where it is coupled to processor 38. Processor 38 typically and conventionally partitions the message into suitable sized blocks at partitioning module 42. Other software (code) modules in processor 38 include the heap model ("pick a fruit") algorithm module 46 which carries out the code functionality set forth above.

Also coupled to processor 38 are the heap array computer readable storage medium (memory) 52, as well as a third storage 58 for the resulting hash digest. Storage locations 36, 52, 58 may be in one or several conventional physical memory devices (such as semiconductor RAM or its variants or a hard disk drive).

Electric signals conventionally are carried between the various elements of FIG. 3. Not shown in FIG. 3 is the subsequent conventional use of the resulting hash digest, which is compared by processor 38 to a second expected hash value associated with the message. Only if the two hash values match is the message (a digital document, digital signature or similar information) authenticated.

Figure 4:
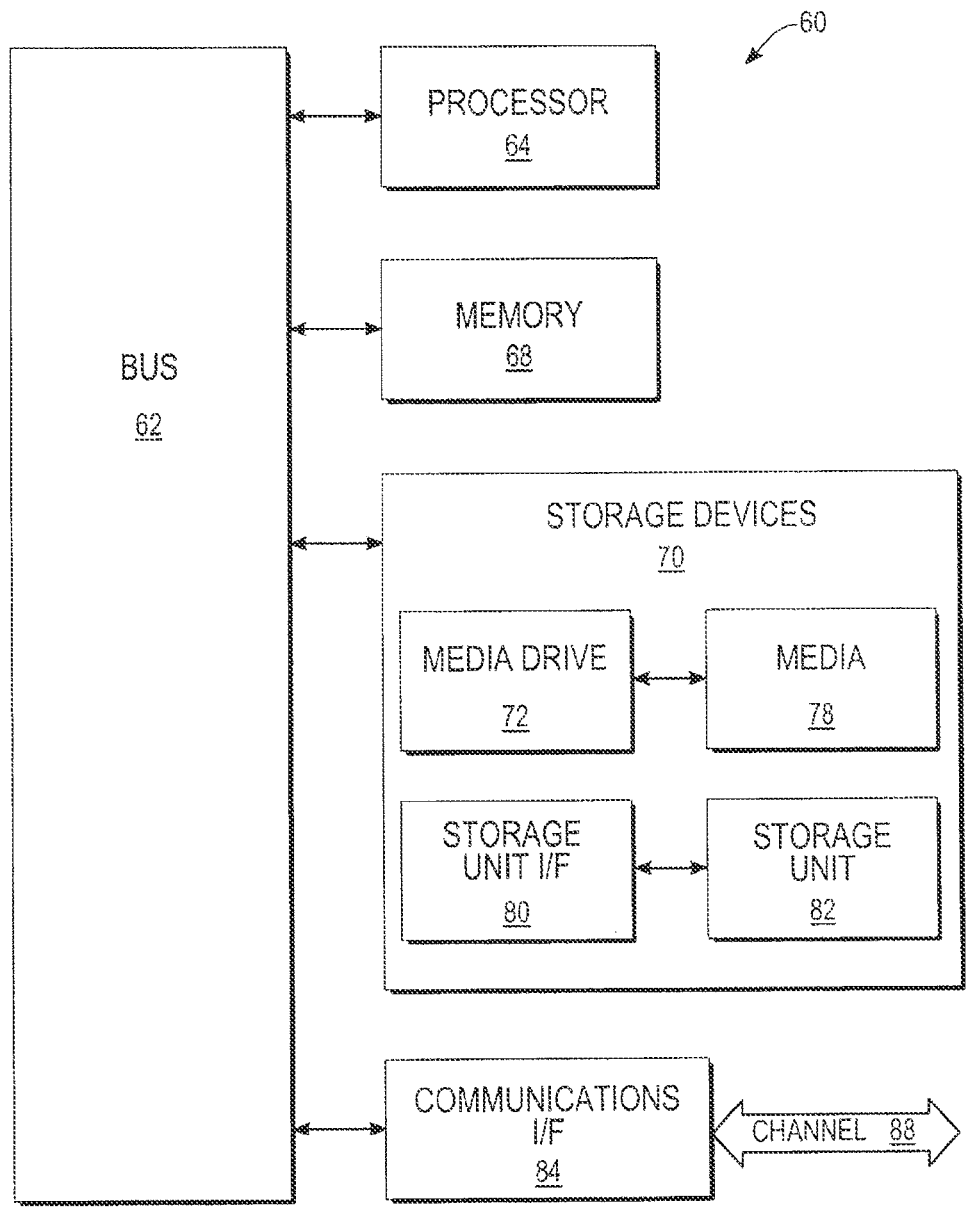
FIG. 4 shows additional detail of the FIG. 2 computing apparatus.

FIG. 4 shows further detail of the computing device in one embodiment. FIG. 4 illustrates a typical and conventional computing system 60 that may be employed to implement processing functionality in embodiments of the invention and shows additional detail of the FIG. 3 system. Computing systems of this type may be used in a computer server or user (client) computer or other computing device, for example. Those skilled in the relevant art will also recognize how to implement embodiments of the invention using other computer systems or architectures. Computing system 60 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 60 can include one or more processors, such as a processor 64 (equivalent to processor 38 in FIG. 2). Processor 64 can be implemented using a general or special purpose processing engine such as, for example, a microprocessor, microcontroller or other control logic. In this example, processor 64 is connected to a bus 62 or other communications medium.

Computing system 60 can also include a main memory 68 (equivalent to memories 36, 58), such as random access memory (RAM) or other dynamic memory, for storing information and instructions to be executed by processor 64. Main memory 68 also may be used for storing temporary variables or other intermediate information during execution of instructions to be executed by processor 64. Computing system 60 may likewise include a read only memory (ROM) or other static storage device coupled to bus 62 for storing static information and instructions for processor 64.

Computing system 60 may also include information storage system 70, which may include, for example, a media drive 62 and a removable storage interface 80. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 78 may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 70 may include other similar components for allowing computer programs or other instructions or data to be loaded into computing system 60. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 60.

Computing system 60 can also include a communications interface 84 (equivalent to port 32 in FIG. 2). Communications interface 84 can be used to allow software and data to be transferred between computing system 60 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 84 are in the form of signals which can be electronic, electromagnetic, optical or other signals capable of being received by communications interface 84. These signals are provided to communications interface 84 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 68, storage device 78, or storage unit 82. These and other forms of computer-readable media may store one or more instructions for use by processor 64, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 60 using, for example, removable storage drive 74, drive 72 or communications interface 84. The control logic (in this example, software instructions or computer program code), when executed by the processor 64, causes the processor 64 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A hashing method performed by a computing apparatus and comprising:
   receiving a message at an input port;
   storing the received message at a first computer readable storage coupled to the input port;
   constructing an array of data from the stored message, wherein the array is at least a two dimensional array representing a plurality of objects arranged in a heap;
   storing a set of values representing the array in a second computer readable storage coupled to a processor, the array representing a state of a heap model algorithm;
   applying the heap model algorithm to the array in order to update the array, wherein applying the heap model algorithm to the array comprises:
   removing at least one of the objects; and
   replacing the object with another of the objects in the heap;
   repeating the storing of the set of values in the second computer readable storage and applying the heap model algorithm to the array until the heap model state reaches a predetermined state;
   using the updated array to provide a hash value of the message; and
   storing the hash value in a third computer readable storage.

2. The method of claim 1, wherein the other of the objects is selected by a pseudo random process.

3. The method of claim 1, wherein applying the heap model algorithm further comprises modeling a plurality of uniform objects in contact with one another under an influence of a force.

4. The method of claim 3, wherein the force is modeled as being gravity.

5. The method of claim 3, wherein the modeling further includes modeling the removal of one of the objects and replacing the removed object by another of the objects in a previous location of the removed object under the influence of the force.

6. The method of claim 1 further comprising:
   receiving a hash value associated with the message;
   comparing the received hash value to the stored hash value; and
   authenticating the message if the comparison indicates a match.

7. The method of claim 1, wherein the message is one of a digital signature or document, a digital message, a secret key or an identifier.

8. The method of claim 1, wherein each value in the array is one bit of data, one byte of data, one 16-bit word, one 32-bit word, or one 128-bit word.

9. The method of claim 1, wherein the heap is configured as a rectangular, triangular, or square array of the objects.

10. The method of claim 1 further comprising providing a parameter and repeatedly applying of the heap model algorithm to the array a number of times defined by the parameter.

11. The method of claim 1, wherein the objects are of equal or different sizes.

12. The method of claim 1, wherein the objects are other than spherical.

13. The method of claim 1, wherein applying the heap model algorithm further comprises removing a plurality of the objects and replacing each with another of the objects.

14. A non-transitory computer readable medium storing computer code instructions for executing the method of claim 1 on the computing apparatus.

15. An apparatus for computing a hash, comprising:
an input port for receiving a message;
a first computer readable storage coupled to the input port for storing the received message; and
a processor coupled to the first storage for constructing an array of data from a portion of the stored message, wherein the array is at least a two dimensional array representing a plurality of objects arranged in a heap;
wherein the processor stores a set of values representing the array in a second computer readable storage coupled to the processor, the array representing a state of a heap model algorithm;
wherein to update the array, the processor applies the heap model algorithm to the array by (i) removing at least one of the objects, and (ii) replacing the object with another of the objects in the heap;
wherein the processor repeatedly stores the set of values in the second computer readable storage and applies the heap model algorithm to the array until the heap model state reaches a predetermined state;
wherein the processor uses the updated array to provide a hash value of the message; and
wherein the processor stores the hash value in a third computer readable storage coupled to the processor.

16. The apparatus of claim 15, wherein the other of the objects is selected by a pseudo random process.

17. The apparatus of claim 15, wherein the processor further applies the heap model algorithm by modeling a plurality of uniform objects in contact with one another under an influence of a force.

18. The apparatus of claim 17, wherein the force is modeled as being gravity.

19. The apparatus of claim 17, wherein the modeling further includes modeling the removal of one of the objects and replacing the removed object by another of the objects in a previous location of the removed object under the influence of the force.

20. The apparatus of claim 15, wherein the processor further:
(i) receives from the port a hash value associated with the message;
(ii) compares the received hash value to the stored hash value; and
(iii) authenticates the message if the comparison indicates a match.

21. The apparatus of claim 15, wherein the message is one of a digital signature or document, a digital message, a secret key or an identifier.

22. The apparatus of claim 15, wherein each value in the array is one bit of data, one byte of data, one 16-bit word, one 32-bit word, or one 128-bit word.

23. The apparatus of claim 15, wherein the heap is configured as a rectangular, triangular, or square array of the objects.

24. The apparatus of claim 15, wherein the objects are of equal or different sizes.

25. The apparatus of claim 15, wherein the objects are other than spherical.

26. The apparatus of claim 15, wherein the processor further applies the heap model algorithm by removing a plurality of the objects and replacing each with another of the objects.

* * * * *